(12) United States Patent
Hong et al.

(10) Patent No.: US 12,207,290 B2
(45) Date of Patent: Jan. 21, 2025

(54) METHOD FOR TRANSMITTING AND RECEIVING SIDELINK SIGNAL IN WIRELESS COMMUNICATION SYSTEM

(71) Applicant: LG ELECTRONICS INC., Seoul (KR)

(72) Inventors: Uihyun Hong, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 396 days.

(21) Appl. No.: 17/635,328

(22) PCT Filed: Aug. 18, 2020

(86) PCT No.: PCT/KR2020/010979
§ 371 (c)(1),
(2) Date: Feb. 14, 2022

(87) PCT Pub. No.: WO2021/034083
PCT Pub. Date: Feb. 25, 2021

(65) Prior Publication Data
US 2022/0330278 A1    Oct. 13, 2022

Related U.S. Application Data

(60) Provisional application No. 62/887,702, filed on Aug. 16, 2019, provisional application No. 62/887,701, filed on Aug. 16, 2019.

(51) Int. Cl.
*H04W 72/566*    (2023.01)
*H04L 41/0803*   (2022.01)
*H04W 4/40*      (2018.01)

(52) U.S. Cl.
CPC ....... *H04W 72/569* (2023.01); *H04L 41/0803* (2013.01); *H04W 4/40* (2018.02)

(58) Field of Classification Search
CPC ..... H04W 72/569; H04W 4/40; H04W 72/25; H04W 4/50; H04W 92/18; H04L 41/0803
See application file for complete search history.

(56) References Cited

U.S. PATENT DOCUMENTS

2020/0022089 A1*  1/2020  Guo ............... H04L 1/1812
2022/0330261 A1* 10/2022  Yeo ............... H04L 5/0053

FOREIGN PATENT DOCUMENTS

WO    WO-2013141592 A1 *  9/2013  ........... H04L 5/0037

OTHER PUBLICATIONS

Vivo, Discussion on mode 2 resource allocation mechanism, Apr. 8-12, 2019, 3GPP TSG RAN WG1 #96bis, R1-1904074 (Year: 2019).*

(Continued)

*Primary Examiner* — Charles C Jiang
*Assistant Examiner* — Rachel Elizabeth Marks
(74) *Attorney, Agent, or Firm* — BRYAN CAVE LEIGHTON PAISNER LLP

(57) ABSTRACT

An aspect of the present disclosure is a method for user equipment in a wireless communication system, wherein a physical sidelink control channel (PSCCH) and a physical sidelink shared channel (PSSCH) are received on an aggregation slot including a plurality of slots, and a sidelink signal is transmitted on a resource selected on the basis of at least one among a reference signal received power (RSRP), a received signal strength indication (RSSI), and a reference signal received quality (RSRQ), which are measured from the aggregation slot. The RSRP is measured from each of slots, on which a plurality of PSCCHs are received, among (Continued)

the plurality of slots on the basis of the plurality of PSCCHs being received on the aggregation slot.

3 Claims, 23 Drawing Sheets

(56) References Cited

OTHER PUBLICATIONS

Machine translated version of WO 2013/141592 retrieved from PE2E on May 9, 2024 (Year: 2013).*
ITL, "Discussion on NR V2X HARQ mechanism", 3GPP TSG RAN WG1 Meeting #95, Nov. 12-16, 2018, R1-1813976.
Nokia, Nokia Shanghai Bell, "On Sidelink Resource Allocation", 3GPP TSG RAN WG1 Meeting #96, Feb. 25-Mar. 1, 2019, R1-1902576.
Vivo, "Discussion on mode 2 resource allocation mechanism", 3GPP TSG RAN WG1 #96bis, Apr. 8-12, 2019, R1-1904074.
InterDigital Inc., "NR Sidelink Resource Allocation Mechanism for Mode 2", 3GPP TSG RAN WG1 #96bis, Apr. 8-12, 2019, R1-1905402.
Qualcomm Incorporated, "Sidelink Resource Allocation Mechanism for NR V2X", 3GPP TSG RAN WG1 Meeting #97, May 13-17, 2019, R1-1907271.

* cited by examiner (a)

(b)

(a)

(b)

(a)

(b)

METHOD FOR TRANSMITTING AND RECEIVING SIDELINK SIGNAL IN WIRELESS COMMUNICATION SYSTEM

This application is the National Stage filing under 35 U.S.C. 371 of International Application No. PCT/KR2020/010979 filed on Aug. 18, 2020, which claims priority to U.S. Provisional Application Nos. 62/887,701 filed on Aug. 16, 2019 and 62/887,702 filed on Aug. 16, 2019, the contents of which are all hereby incorporated by reference herein in their entirety.

TECHNICAL FIELD

The present disclosure relates to a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and multi carrier frequency division multiple access (MC-FDMA) system, etc.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

Various embodiments of the present disclosure may provide a method of transmitting and receiving a signal in a wireless communication system and an apparatus for supporting the method.

In detail, various embodiments of the present disclosure may provide a resource selection/reselection method and an apparatus for supporting the same for ensuring multi-slots when slot aggregation is applied in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

Various embodiments of the present disclosure may provide a method of transmitting and receiving a signal in a wireless communication system and an apparatus for supporting the method.

According to an aspect of the present disclosure, a method of a user equipment (UE) in a wireless communication system includes receiving a physical sidelink control channel (PSCCH) and a physical sidelink shared channel (PSSCH) on an aggregation slot, the aggregation slot including multi-slots, and transmitting a sidelink signal on a resource selected based on at least one of reference signal received power (RSRP), received signal strength indication (RSSI), or reference signal received quality (RSRQ), measured from the aggregation slot, wherein, based on reception of the plurality of PSCCHs on the aggregation slot, the RSRP is measured from each of slots in which the plurality of PSCCHs are received among the multi-slots.

The selected resource may be selected based on a minimum value, a maximum value, or an average value of RSRP values measured from the respective slots in which the plurality of PSCCHs are received.

Based on that priority configured for data received on the aggregation slot is equal to or greater than preconfigured reference priority, the selected resource may be selected based on the maximum value of the RSRP values measured from each of the respective slots in which the plurality of PSCCHs are received.

The RSRP may be measured from at least one slot for receiving at least one PSCCH, decoding of which is successful, among the plurality of PSCCHs.

The selected resource may be selected based on RSSI values measured from each of N slots from a slot located first in a time domain among slots in which the plurality of PSCCHs are received, N being a natural number.

The selected resource may be selected from remaining resources except for a resource with the RSRP equal to or greater than a preconfigured threshold among a plurality of resources included in the selection window.

According to another aspect of the present disclosure, an apparatus for a user equipment (UE) in a wireless communication system includes at least one processor, and at least one memory operatively connected to the at least one processor and configured to store at least one instruction for allowing the at least one processor to perform operations, wherein the operations includes receiving a physical sidelink control channel (PSCCH) and a physical sidelink shared channel (PSSCH) on an aggregation slot, the aggregation slot including multi-slots, and transmitting a sidelink signal on a resource selected based on at least one of reference signal received power (RSRP), received signal strength indication (RSSI), or reference signal received quality (RSRQ), measured from the aggregation slot, and based on reception of the plurality of PSCCHs on the aggregation slot, the RSRP is measured from each of slots in which the plurality of PSCCHs are received among the multi-slots.

The selected resource may be selected based on a minimum value, a maximum value, or an average value of RSRP values measured from the respective slots in which the plurality of PSCCHs are received.

Based on that priority configured for data received on the aggregation slot is equal to or greater than preconfigured reference priority, the selected resource may be selected based on the maximum value of the RSRP values measured from each of the respective slots in which the plurality of PSCCHs are received.

The RSRP may be measured from at least one slot for receiving at least one PSCCH, decoding of which is successful, among the plurality of PSCCHs.

The selected resource may be selected based on RSSI values measured from each of N slots from a slot located first in a time domain among slots in which the plurality of PSCCHs are received, N being a natural number.

The UE may be an autonomous driving vehicle or may be included in the autonomous driving vehicle.

Another aspect of the present disclosure provides a processor for performing operations for a user equipment (UE) in a wireless communication system, the operations including receiving a physical sidelink control channel (PSCCH) and a physical sidelink shared channel (PSSCH) on an aggregation slot, the aggregation slot including multi-slots, and transmitting a sidelink signal on a resource selected based on at least one of reference signal received power (RSRP), received signal strength indication (RSSI), or reference signal received quality (RSRQ), measured from the aggregation slot, wherein, based on reception of the plurality of PSCCHs on the aggregation slot, the RSRP is measured from each of slots in which the plurality of PSCCHs are received among the multi-slots.

Another aspect of the present disclosure provides a computer-readable recording medium for storing at least one computer program including at least one instruction for allowing at least one processor to perform operations for a user equipment (UE) when being executed by the at least one processor, the operations including receiving a physical sidelink control channel (PSCCH) and a physical sidelink shared channel (PSSCH) on an aggregation slot, the aggregation slot including multi-slots, and transmitting a sidelink signal on a resource selected based on at least one of reference signal received power (RSRP), received signal strength indication (RSSI), or reference signal received quality (RSRQ), measured from the aggregation slot, wherein, based on reception of the plurality of PSCCHs on the aggregation slot, the RSRP is measured from each of slots in which the plurality of PSCCHs are received among the multi-slots.

The various examples of the present disclosure described above are only some of the exemplary examples of the present disclosure, and various examples to which the technical features of various examples of the present disclosure are applied may be derived and understood based on the detailed description by those of ordinary skill in the art.

Advantageous Effects

Various embodiments of the present disclosure may have the following effects.

Various embodiments of the present disclosure may provide a resource selection/reselection method and an apparatus for supporting the same for ensuring multi-slots when slot aggregation is applied in a wireless communication system.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

In the drawings.

BEST MODE

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs 01-DMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
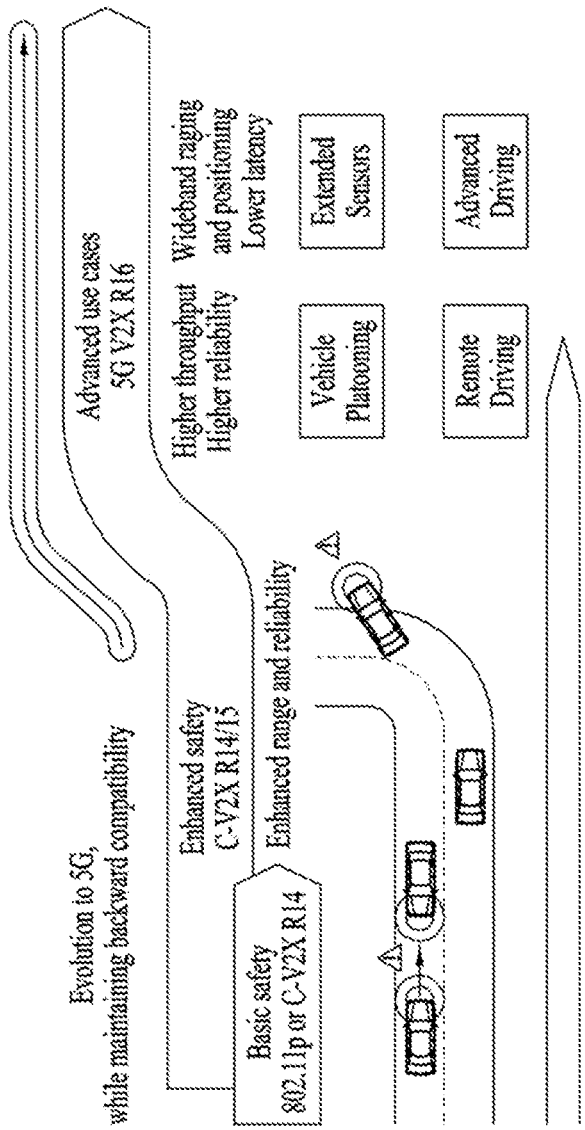
FIG. 1 is a diagram illustrating vehicle-to-everything (V2X) communication based on pre-new radio access technology (NR) RAT and V2X communication based on NR in comparison.
Figure 2:
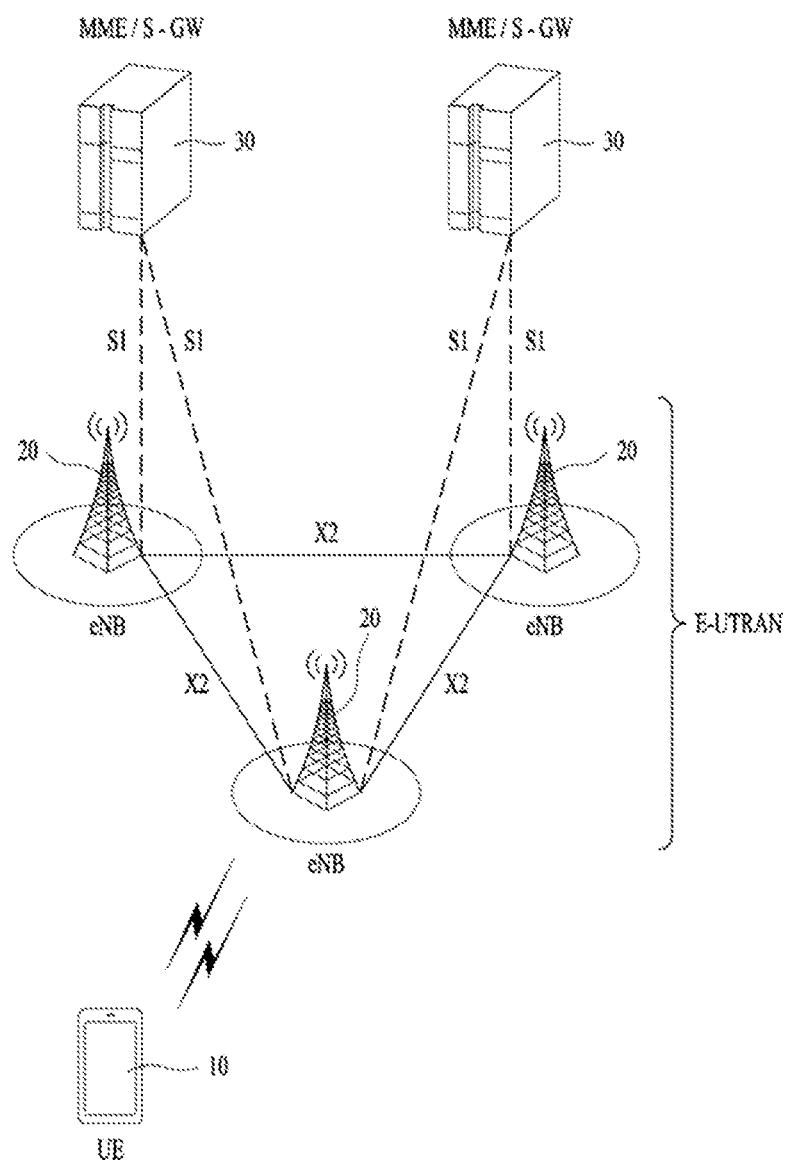
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
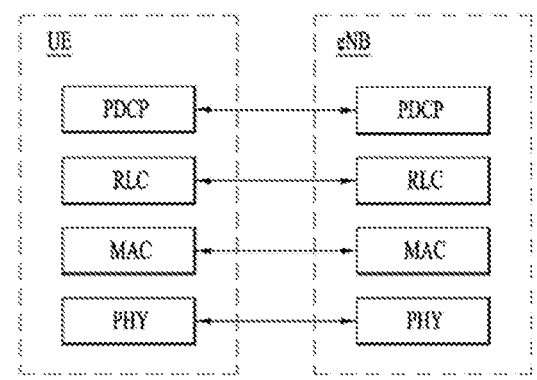
FIG. 3 is a diagram illustrating user-plane and control-plane radio protocol architectures according to an embodiment of the present disclosure.
Figure 3:
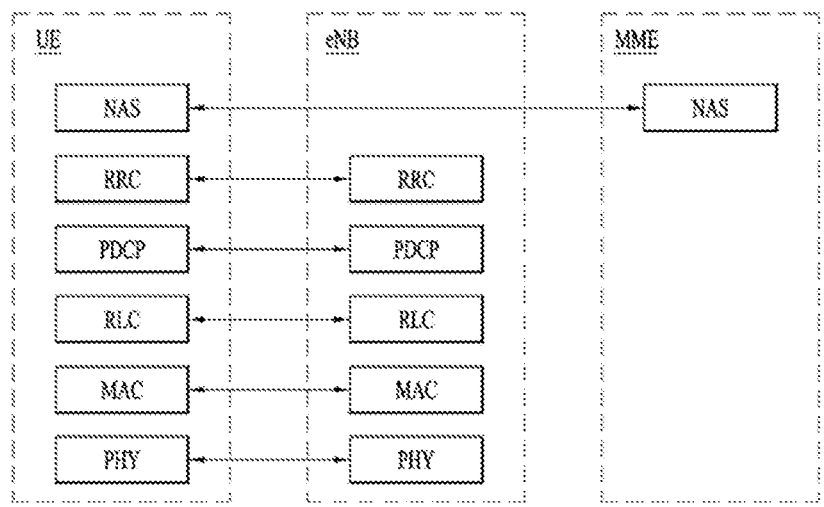

FIG. 3(*a*) illustrates a user-plane radio protocol architecture according to an embodiment of the disclosure.

FIG. 3(*b*) illustrates a control-plane radio protocol architecture according to an embodiment of the disclosure. A user plane is a protocol stack for user data transmission, and a control plane is a protocol stack for control signal transmission.

Referring to FIGS. 3(*a*) and 3(*b*), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel A transmission time interval (TTI) is a unit time for subframe transmission.

Figure 4:
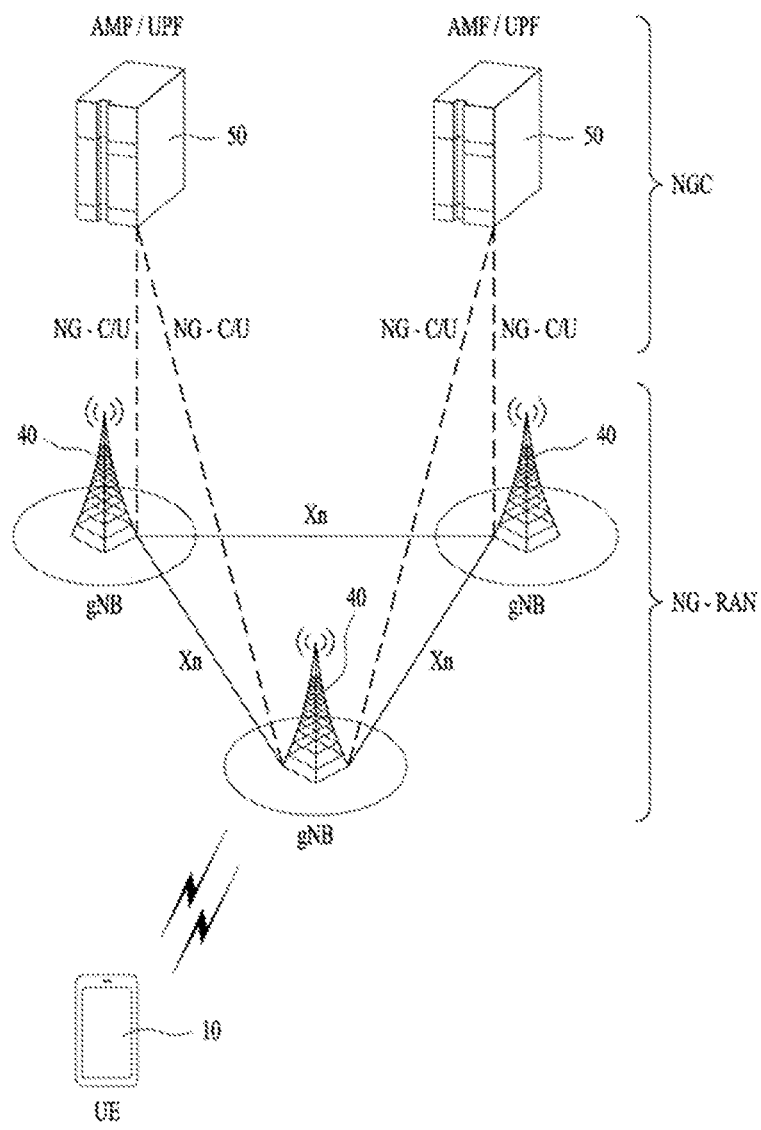
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
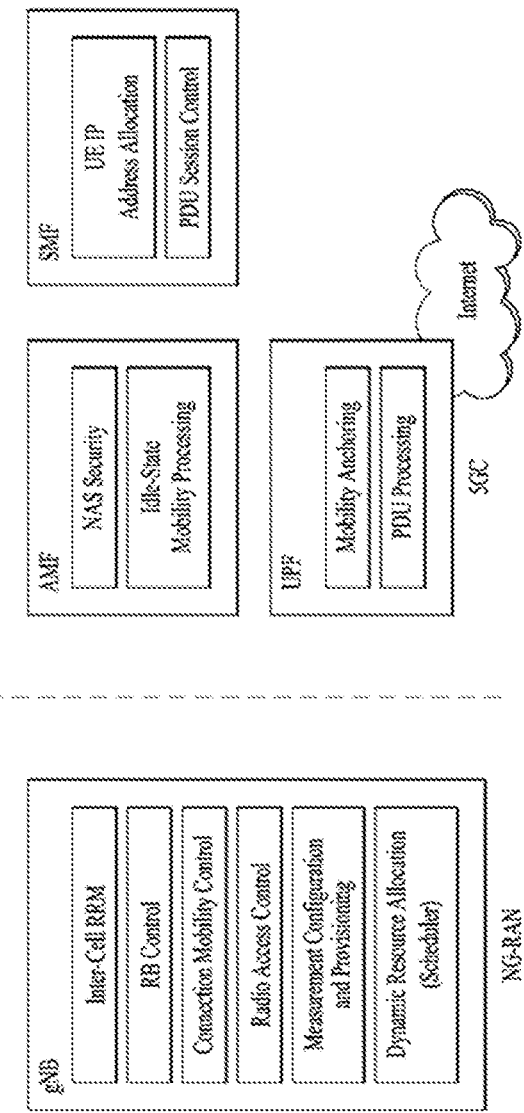
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
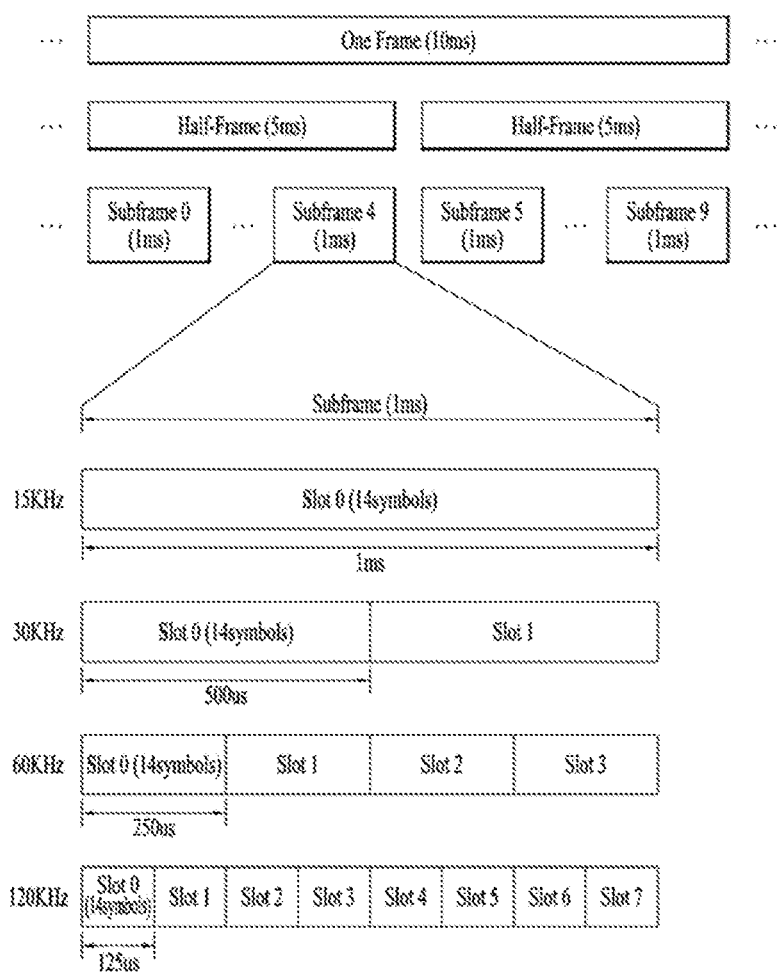
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration μ in the NCP case.

TABLE 1

| SCS (15*2u) | Nslotsymb | Nframe, uslot | Nsubframe, uslot |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | Nslotsymb | Nframe, uslot | Nsubframe, uslot |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
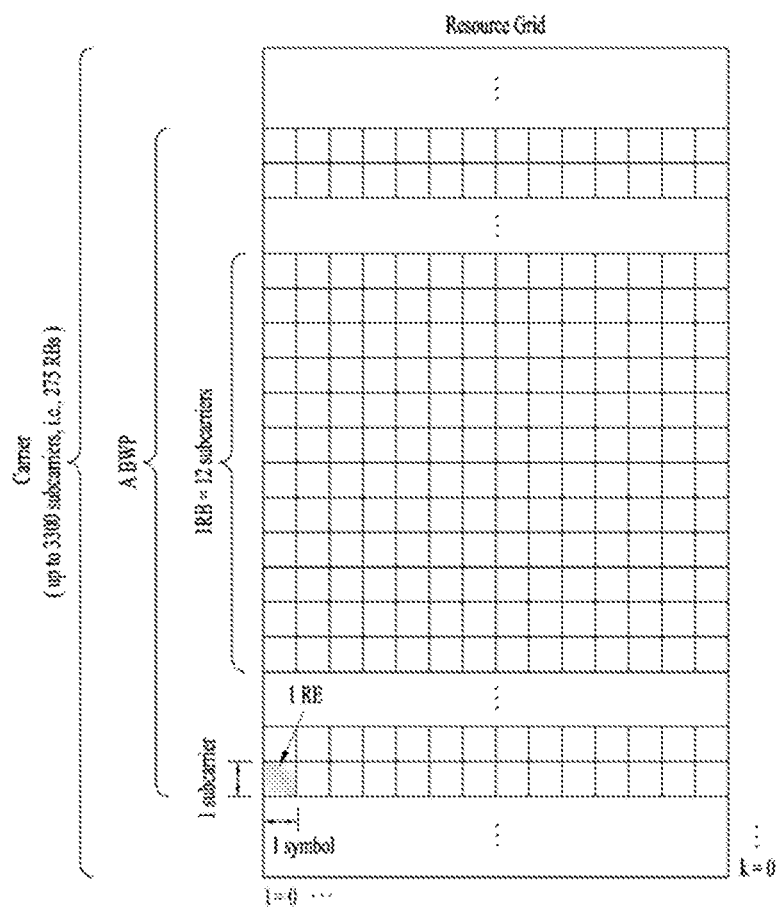
FIG. 7 is a diagram illustrating a slot structure in an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
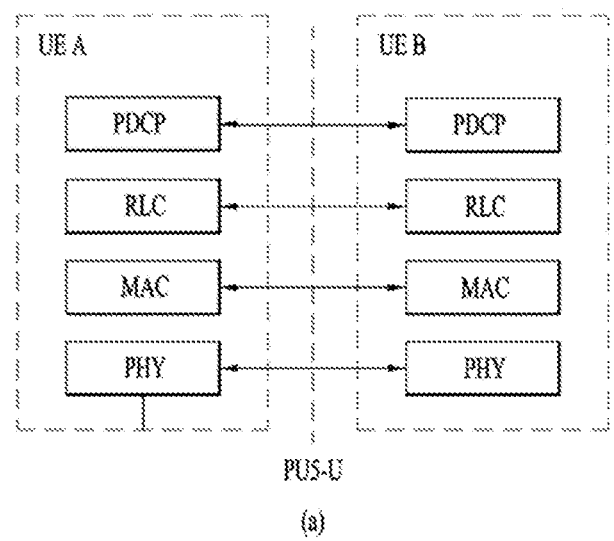
FIG. 8 is a diagram illustrating radio protocol architectures for sidelink (SL) communication according to an embodiment of the present disclosure.
Figure 8:
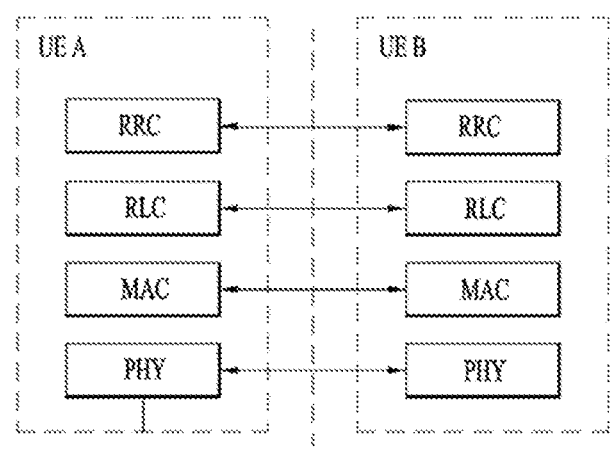

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
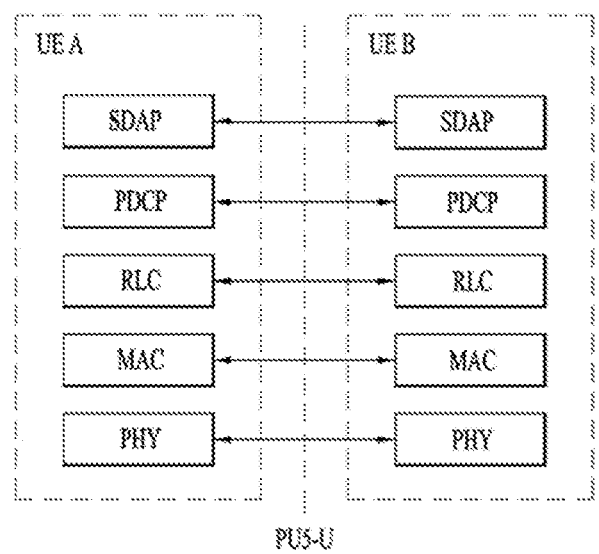
FIG. 9 is a diagram illustrating radio protocol architectures for SL communication according to an embodiment of the present disclosure.
Figure 9:
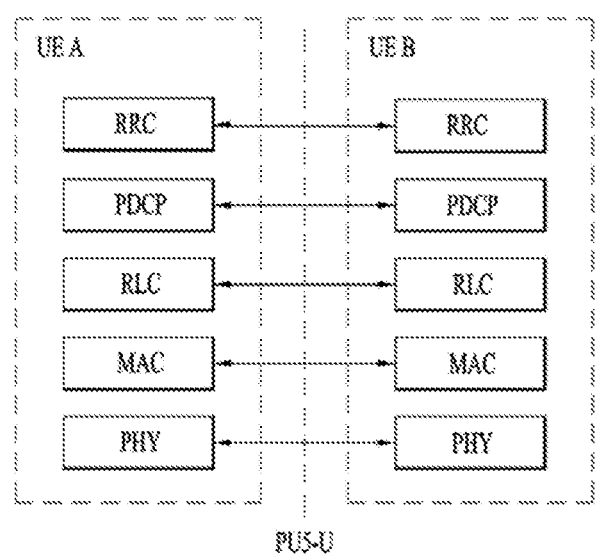

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Sidelink synchronization signals (SLSSs) and synchronization information will be described below.

The SLSSs, which are SL-specific sequences, may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold-sequences may be used for the S-SSS. For example, the UE may detect an initial signal and acquire synchronization by using the S-PSS. For example, the UE may acquire fine synchronization and detect a synchronization signal ID, by using the S-PSS and the S-SSS.

A physical sidelink broadcast channel (PSBCH) may be a (broadcast) channel carrying basic (system) information that the UE needs to first know before transmitting and receiving an SL signal. For example, the basic information may include information related to the SLSSs, duplex mode (DM) information, time division duplex (TDD) UL/DL (UL/DL) configuration information, resource pool-related information, information about the type of an application related to the SLSSs, subframe offset information, broadcast information, and so on. For example, the payload size of the PSBCH may be 56 bits, including a 24-bit cyclic redundancy check (CRC), for evaluation of PSBCH performance in NR V2X.

The S-PSS, S-SSS, and PSBCH may be included in a block format (e.g., SL synchronization signal (SL SS)/PSBCH block, hereinafter, referred to as sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in a carrier, and the transmission bandwidth of the S-SSB may be within a (pre)configured SL BWP. For example, the bandwidth of the S-SSB may be 11 RBs. For example, the PSBCH may span 11 RBs. The frequency position of the S-SSB may be (pre)set. Therefore, the UE does not need to perform hypothesis detection in a frequency to discover the S-SSB in the carrier.

In the NR SL system, a plurality of numerologies including different SCSs and/or CP lengths may be supported. As an SCS increases, the length of a time resource for S-SSB transmission of a UE may be shortened. Accordingly, in order to ensure coverage of the S-SSB, a transmitting UE may transmit one or more S-SSBs to a receiving terminal within one S-SSB transmission period according to the SCS. For example, the number of S-SSBs that the transmitting terminal transmits to the receiving terminal within one S-SSB transmission period may be pre-configured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two or four S-SSBs to the receiving UE within one S-SSB transmission period.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission period.

When the SCS is 60 kHz, two types of CPs may be supported. Further, the structure of an S-SSB transmitted by the transmitting UE to the receiving UE may be different according to a CP type. For example, the CP type may be an NCP or an ECP. Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol of the S-SSB transmitted by the transmitting UE. For example, upon receipt of the S-SSB, the receiving UE may perform an automatic gain control (AGC) operation in the first symbol period of the S-SSB.

Figure 10:
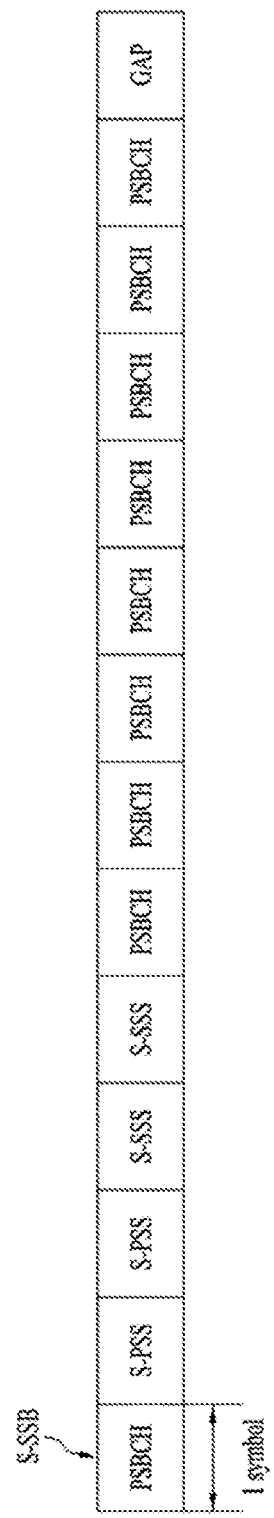
FIG. 10 is a diagram illustrating the structure of a secondary synchronization signal block (S-SSB) in a normal cyclic prefix (NCP) case according to an embodiment of the present disclosure.

FIG. 10 illustrates the structure of an S-SSB in an NCP case according to an embodiment of the present disclosure.

For example, when the CP type is NCP, FIG. 10 may be referred to for the structure of the S-SSB, that is, the order of symbols to which the S-PSS, S-SSS and PSBCH are mapped in the S-SSB transmitted by the transmitting UE.

Figure 11:
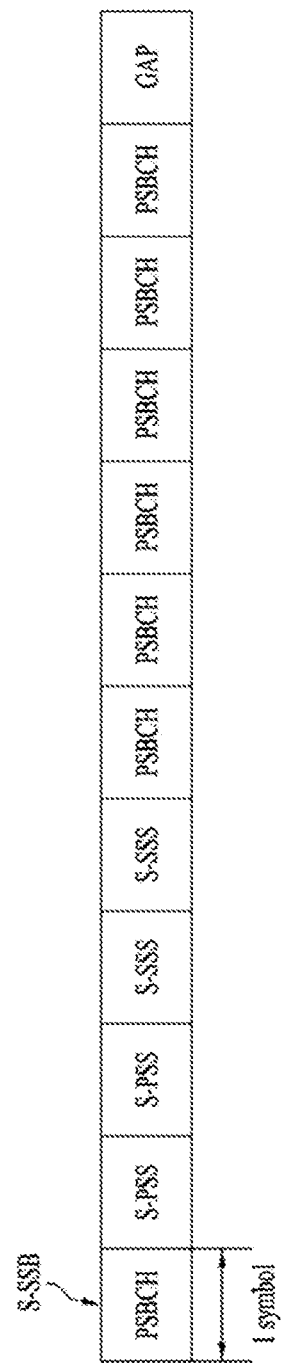
FIG. 11 is a diagram illustrating the structure of an S-SSB in an extended cyclic prefix (ECP) case according to an embodiment of the present disclosure.

FIG. 11 illustrates the structure of an S-SSB in an ECP case according to an embodiment of the present disclosure.

In the ECP case, for example, the number of symbols to which the PSBCH is mapped after the S-SSS in the S-SSB may be 6, unlike FIG. 10. Therefore, the coverage of the S-SSB may be different depending on whether the CP type is NCP or ECP.

Each SLSS may have a sidelink synchronization identifier (SLSS ID).

For example, in LTE SL or LTE V2X, the values of SLSS IDs may be defined based on combinations of two different S-PSS sequences and 168 different S-SSS sequences. For example, the number of SLSS IDs may be 336. For example, the value of an SLSS ID may be any one of 0 to 335.

For example, in NR SL or NR V2X, the values of SLSS IDs may be defined based on combinations of two different S-PSS sequences and 336 different S-SSS sequences. For example, the number of SLSS IDs may be 672. For example, the value of an SLSS ID may be any one of 0 to 671. For example, one of the two different S-PSSs may be associated with in-coverage and the other S-PSS may be associated with out-of-coverage. For example, the SLSS ID of 0 to 335 may be used for in-coverage, whereas the SLSS IDs of 336 to 671 may be used for out-of-coverage.

In order to improve the S-SSB reception performance of the receiving UE, the transmitting UE needs to optimize transmission power according to the characteristics of each signal included in the S-SSB. For example, the transmitting UE may determine a maximum power reduction (MPR) value for each signal included in the S-SSB according to the peak-to-average power ratio (PAPR) of the signal. For example, when the PAPR value is different between the S-PSS and the S-SSS in the S-SSB, the transmitting UE may apply an optimal MPR value to each of the S-PSS and the S-SSS to improve the S-SSB reception performance of the receiving UE. For example, a transition period may further be applied so that the transmitting UE performs an amplification operation for each signal. The transition period may preserve a time required for a transmission-end amplifier of the transmitting UE to perform a normal operation at the boundary at which the transmission power of the transmitting UE is changed. For example, the transition period may be 10 us in FR1, and 5 us in FR2. For example, a search window in which the receiving UE detects the S-PSS may be 80 ms and/or 160 ms.

Figure 12:
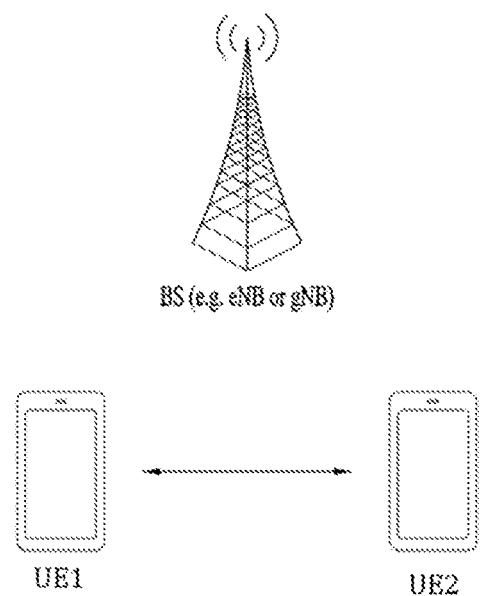
FIG. 12 is a diagram illustrating user equipments (UEs) which conduct V2X or SL communication between them according to an embodiment of the present disclosure.

FIG. 12 illustrates UEs that conduct V2X or SL communication between them according to an embodiment of the present disclosure.

Referring to FIG. 12, the term "UE" in V2X or SL communication may mainly refer to a terminal of a user. However, when network equipment such as a BS transmits and receives a signal according to a UE-to-UE communication scheme, the BS may also be regarded as a kind of UE. For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 13:
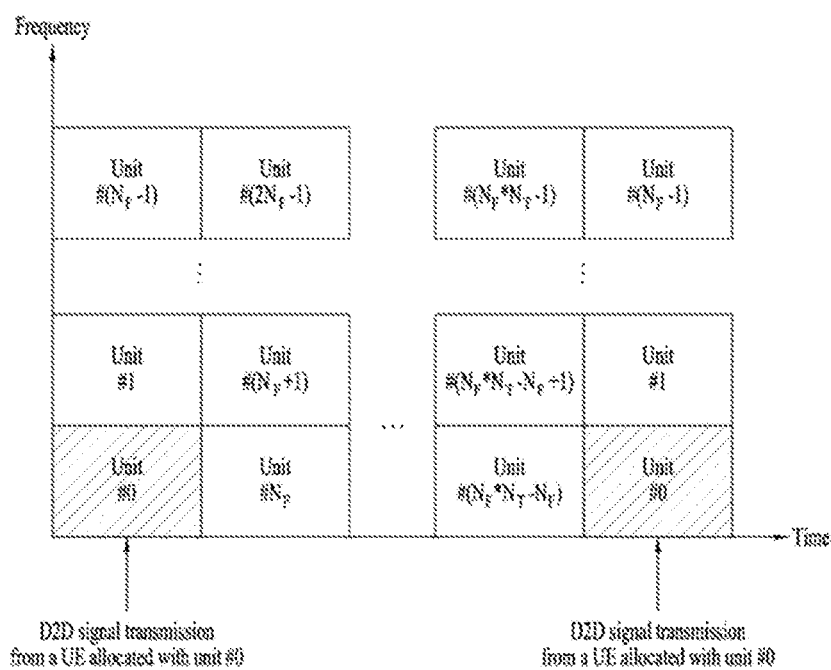
FIG. 13 is diagram illustrating resource units for V2X or SL communication according to an embodiment of the present disclosure.

FIG. 13 illustrates resource units for V2X or SL communication according to an embodiment of the present disclosure.

Referring to FIG. 13, the total frequency resources of a resource pool may be divided into NF frequency resources, and the total time resources of the resource pool may be divided into NT time resources. Thus, a total of NF*NT resource units may be defined in the resource pool. FIG. 13 illustrates an example in which the resource pool is repeated with a periodicity of NT subframes.

As illustrates in FIG. 13, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel.

(2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

Resource allocation in SL will be described below.

Figure 14:
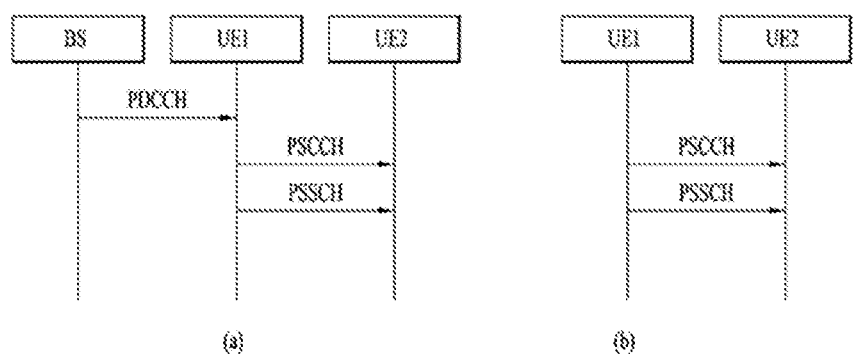
FIG. 14 is a diagram illustrating signal flows for V2X or SL communication procedures of a UE according to transmission modes according to an embodiment of the present disclosure.

FIG. 14 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 14 (a) illustrates a UE operation related to LTE transmission mode 1 or LTE transmission mode 3. Alternatively, for example, FIG. 14 (a) illustrates a UE operation related to NR resource allocation mode 1. For example, LTE transmission mode 1 may be applied to general SL communication, and LTE transmission mode 3 may be applied to V2X communication.

For example, FIG. 14 (b) illustrates a UE operation related to LTE transmission mode 2 or LTE transmission mode 4. Alternatively, for example, FIG. 14 (b) illustrates a UE operation related to NR resource allocation mode 2.

Referring to FIG. 14 (a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 14 (b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

Alternatively, when the RSSI measurement of the candidate resource is less than the RSSI threshold, the second UE may (re)select the candidate resource. Here, the RSSI measurement value may be a linear average value measured for subchannels of resources related to the candidate resource within a sensing window.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or An SL CSI-RS transmission indicator or information about the number of SL CSI-RS antenna ports (to be transmitted);

Location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Carrier reselection will be described below.

In V2X or SL communication, the UE may perform carrier reselection based on the channel busy ratios (CBRs) of configured carriers and/or the PPPP of a V2X message to be transmitted. For example, carrier reselection may be performed in the MAC layer of the UE. In various embodiments of the present disclosure, PPPP and ProSe per packet reliability (PPPR) may be interchangeably used with each other. For example, as a PPPP value is smaller, this may mean a higher priority, and as the PPPP value is larger, this may mean a lower priority. For example, as a PPPR value is smaller, this may mean higher reliability, and as the PPPR value is larger, this may mean lower reliability. For example, a PPPP value related to a service, packet or message with a higher priority may be less than a PPPP value related to a service, packet or message with a lower priority. For example, a PPPR value related to a service, packet or message with higher reliability may be less than a PPPR value related to a service, packet or message with lower reliability.

A CBR may refer to the fraction of sub-channels in a resource pool, of which the sidelink-received signal strength indicator (S-RSSI) measured by the UE is sensed as exceeding a predetermined threshold. There may be a PPPP related to each logical channel, and the configuration of the PPPP value should reflect latency requirements of both the UE and the BS. During carrier reselection, the UE may select one or more of candidate carriers in an ascending order from the lowest CBR.

SL measurement and reporting will be described below.

For the purpose of QoS prediction, initial transmission parameter setting, link adaptation, link management, admission control, and so on, SL measurement and reporting (e.g., measurement and reporting of an RSRP or an RSRQ) between UEs may be considered in SL. For example, an RX-UE may receive an RS from a TX-UE and measure the channel state of the TX-UE based on the RS. Further, the RX-UE may report CSI to the TX-UE. SL measurement and reporting may include measurement and reporting of a CBR and reporting of location information. Examples of CSI for V2X may include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and so on. For unicast communication, a CQI, an RI, and a PMI or some of them may be supported in a non-subband-based aperiodic CSI report based on the assumption of four or fewer antenna ports. The CSI procedure may not depend on a standalone RS. CSI reporting may be activated and deactivated depending on a configuration.

For example, the TX-UE may transmit a channel state information-reference signal (CSI-RS) to the RX-UE, and the RX-UE may measure a CQI or an RI using the CSI-RS. For example, the CSI-RS may be referred to as an SL CSI-RS. For example, the CSI-RS may be confined to within a PSSCH transmission. For example, the TX-UE may transmit the CSI-RS in a PSSCH resource to the RX-UE.

Hereinafter, a Hybrid Automatic Repeat Request (HARQ) procedure will be described.

An error compensation scheme for ensuring communication reliability may include a Forward Error Correction (FEC) scheme and an Automatic Repeat Request (ARQ) scheme. In the FEC scheme, error at a reception end may be corrected by adding an extra error correction code to information bits. The FEC scheme is advantageous in that time delay is low and information that is separately transmitted and received between transmission and reception ends is not required, but is disadvantageous in that system efficiency is degraded in a fine channel environment. The ARQ scheme has high transmission reliability, but is disadvantageous in that time delay occurs and system efficiency is degraded in a poor channel environment.

The Hybrid Automatic Repeat Request (HARQ) scheme is obtained by combining the FEC and the ARQ, and in this case, performance may be improving performance by checking whether data received by a physical layer contains error that is not capable of being decoded and requesting retransmission when error occurs.

In the case of SL unicast and groupcast, HARQ feedback and HARQ combining at a physical layer may be supported. For example, when a reception UE operates in a resource allocation mode 1 or 2, the reception UE may receive a PSSCH from a transmission UE, and the reception UE may transmit HARQ feedback with respect to the PSSCH to the transmission UE using a Sidelink Feedback Control Information (SFCI) format through a physical sidelink feedback channel (PSFCH).

For example, the SL HARQ feedback may be enabled for unicast. In this case, in a non-Code Block Group (non-CBG) operation, the reception UE may decode the PSCCH with the reception UE as a target, and when the reception UE successfully decodes a transmission block related to the PSCCH, the reception UE may generate an HARQ-ACK. The reception UE may transmit the HARQ-ACK to the transmission UE. In contrast, when the reception UE decodes the PSCCH with the reception UE as a target and then does not successfully decode the transmission block related to the PSCCH, the reception UE may generate the HARQ-NACK. The reception UE may transmit the HARQ-NACK to the transmission UE.

For example, the SL HARQ feedback may be enabled for groupcast. For example, in the non-CBG operation, two HARQ feedback options may be supported for the groupcast.

(1) Groupcast option 1: When the reception UE decodes the PSCCH with the reception UE as a target and then fails in decoding the transmission block related to the PSCCH, the reception UE may transmit the HARQ-NACK to the transmission UE on the PSFCH. In contrast, when the reception UE decodes the PSCCH with the reception UE as a target and successfully decodes the transmission block related to the PSCCH, the reception UE may not transmit a HARQ-ACK to the transmission UE.

(2) Groupcast option 2: When the reception UE decodes the PSCCH with the reception UE as a target and then fails in decoding the transmission block related to the PSCCH, the reception UE may transmit the HARQ-NACK to the transmission UE on the PSFCH. When the reception UE decodes the PSCCH with the reception UE as a target and successfully decodes the transmission block related to the PSCCH, the reception UE may transmit the HARQ-ACK to the transmission UE on the PSFCH.

For example, when the groupcast option 1 is used in the SL HARQ feedback, all UEs that perform groupcast communication may share a PSFCH resource. For example, UEs belonging to the same group may transmit the HARQ feedback using the same PSFCH resource.

For example, when the groupcast option 2 is used in the SL HARQ feedback, each UE that performs groupcast communication may use different PSFCH resources in order to transmit the HARQ feedback. For example, UEs belonging to the same group may transmit the HARQ feedback using different PSFCH resources.

For example, when the SL HARQ feedback is enabled for groupcast, the reception UE may determine whether to transmit the HARQ feedback to the transmission UE based on a Transmission-Reception (TX-RX) distance and/or RSRP.

For example, in the case of the HARQ feedback based on the TX-RX distance in the groupcast option 1, when the TX-RX is less than or equal to communication range requirement, the reception UE may transmit the HARQ feedback with respect to the PSSCH to the transmission UE. In contrast, when the TX-RX distance is greater than the communication range requirement, the reception UE may not transmit the HARQ feedback with respect to the PSSCH to the transmission UE. For example, the transmission UE may notify the reception UE about the position of the transmission UE through SCI related to the PSSCH. For example, the SCI related to the PSSCH may be second SCI. For example, the reception UE may estimate or acquire the TX-RX distance based on the position of the reception UE and the position of the transmission UE. For example, the reception UE may decode the SCI related to the PSSCH to know the communication range requirement used in the PSSCH.

For example, in the case of the resource allocation mode 1, a time between the PSFCH and the PSSCH may be configured or preconfigured. In the case of unicast and groupcast, when retransmission on SL, this may be indicated to an eNB by the UE within coverage using the PUCCH. The transmission UE may also transmit indication to a serving eNB of the transmission UE in the form of Scheduling Request (SR)/Buffer Status Report (BSR) that is not the form of HARQ ACK/NACK. Even if the eNB does not receive the indication, the eNB may schedule an SL retransmission resource to the UE. For example, in the case of the resource allocation mode 2, a time between the PSFCH and the PSSCH may be configured or preconfigured.

For example, from a point of view of transmission of a UE in a carrier, TDM between the PSCCH/PSSCH and the PSFCH may be allowed for a PSFCH format for SL in a slot. For example, a sequence-based PSFCH format having one symbol may be supported. Here, the one symbol may not be an AGC period. For example, the sequence-based PSFCH format may be applied to unicast and groupcast.

For example, in a slot related to a resource pool, a PSFCH resource may be periodically configured in N slot periods or preset. For example, N may be configured to one or more values equal to or greater than 1. For example, N may be 1, 2, or 4. For example, the HARQ feedback with respect to transmission in a specific resource pool may be transmitted on only a PSFCH on the specific resource pool.

For example, when the transmission UE transmits the PSSCH to the reception UE over slot #X to slot #N, the reception UE may transmit HARQ feedback with respect to the PSSCH to the transmission UE in slot #(N+A). For example, slot #(N+A) may include a PSFCH resource. Here, for example, A may be the smallest integer equal to or greater than K. For example, K may be the number of logical slots. In this case, K may be the number of slots in a resource pool. For example, K may be the number of physical slots. In this case, K may be number inside and outside the resource pool.

For example, when the reception UE transmits HARQ feedback on a PSFCH resource in response to one PSSCH transmitted to the reception UE by the transmission UE, the reception UE may determine a frequency domain and/or a code domain of the PSFCH resource based on an implicit mechanism within an established resource pool. For example, the reception UE may determine the frequency domain and/or the code domain of the PSFCH resource based on at least one of a slot index related to PSCCH/PSSCH/PSFCH, a subchannel related to PSCCH/PSSCH, and/or an identifier for identifying each reception UE from a group for the HARQ feedback based on the groupcast option 2. In addition/alternatively, for example, the reception UE may determine the frequency domain and/or the code domain of the PSFCH resource based on at least one of SL RSRP, SINR, L1 source ID, and/or position information.

For example, when HARQ feedback transmission on the PSFCH of the UE and HARQ feedback reception on PSFCH overlap each other, the UE may select any one of HARQ feedback transmission on the PSFCH or HARQ feedback reception on the PSFCH based on a priority rule. For example, the priority rule may be based on the minimum priority indication of related PSCCH/PSSCH.

For example, when HARQ feedback transmission of a UE on the PSFCH to a plurality of UEs overlaps, the UE may select specific HARQ feedback transmission based on the priority rule. For example, the priority rule may be based on the minimum priority indication of the related PSCCH/PSSCH.

A BWP and a resource pool will be described below.

When bandwidth adaptation (BA) is used, the reception bandwidth and transmission bandwidth of a UE need not be as large as the bandwidth of a cell, and may be adjusted. For example, the network/BS may inform the UE of the bandwidth adjustment. For example, the UE may receive information/a configuration for bandwidth adjustment from the network/BS. In this case, the UE may perform bandwidth adjustment based on the received information/configuration. For example, the bandwidth adjustment may include a decrease/increase of the bandwidth, a change in the position of the bandwidth, or a change in the SCS of the bandwidth.

For example, the bandwidth may be reduced during a time period of low activity in order to save power. For example, the position of the bandwidth may be shifted in the frequency domain. For example, the position of the bandwidth may be shifted in the frequency domain to increase scheduling flexibility. For example, the SCS of the bandwidth may be changed. For example, the SCS of the bandwidth may be changed to allow a different service. A subset of the total cell bandwidth of a cell may be referred to as a BWP. BA may be implemented by configuring BWPs for the UE and indicating a current active BWP among the configured BWPs to the UE by the BS/network.

Figure 15:
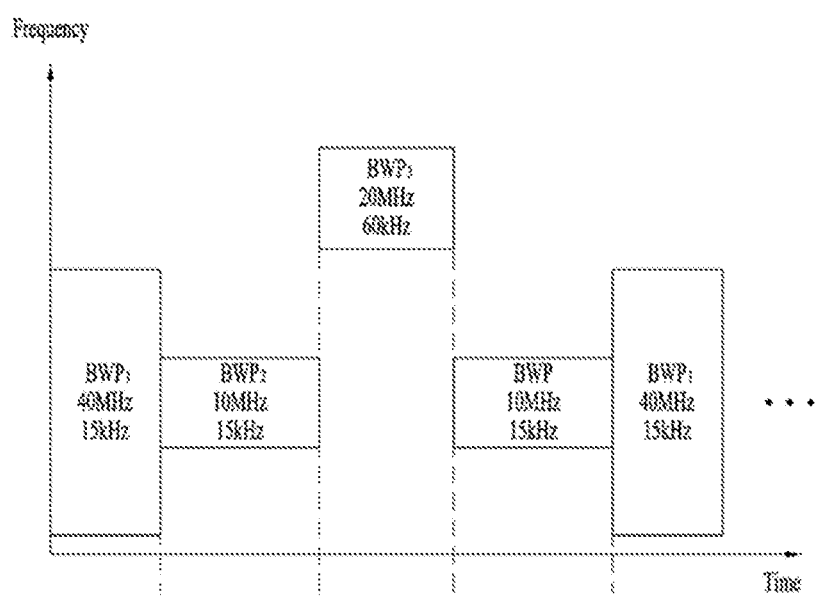
FIG. 15 illustrates a plurality of BWPs according to an embodiment of the present disclosure.

FIG. 15 illustrates a plurality of BWPs according to an embodiment of the present disclosure.

Referring to FIG. 15, BWP1 having a bandwidth of 40 MHz and an SCS of 15 kHz, BWP2 having a bandwidth of 10 MHz and an SCS of 15 kHz, and BWP3 having a bandwidth of 20 MHz and an SCS of 60 kHz may be configured.

Figure 16:
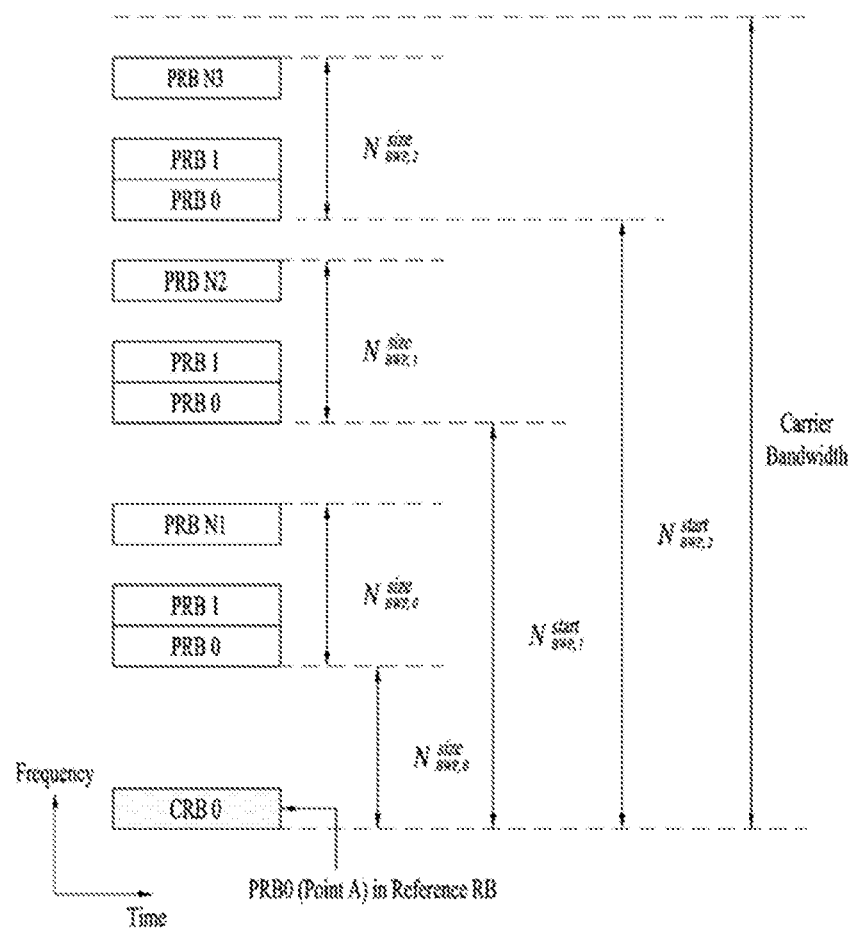
FIG. 16 illustrates BWPs according to an embodiment of the present disclosure.

FIG. 16 illustrates BWPs according to an embodiment of the present disclosure. In the embodiment of FIG. 16, it is assumed that there are three BWPs.

Referring to FIG. 16, common resource blocks (CRBs) may be carrier RBs numbered from one end of a carrier band to the other end of the carrier band. PRBs may be RBs numbered within each BWP. A point A may indicate a common reference point for a resource block grid.

A BWP may be configured by the point A, an offset NstartBWP from the point A, and a bandwidth NsizeBWP. For example, the point A may be an external reference point for a PRB of a carrier, in which subcarrier 0 is aligned for all numerologies (e.g., all numerologies supported in the carrier by the network). For example, the offset may be a PRB interval between the lowest subcarrier for a given numerology and the point A. For example, the bandwidth may be the number of PRBs for the given technology.

A BWP may be defined for SL. The same SL BWP may be used for transmission and reception. For example, a transmitting UE may transmit an SL channel or an SL signal in a specific BWP, and a receiving UE may receive the SL channel or the SL signal in the specific BWP. In a licensed carrier, an SL BWP may be defined separately from a Uu BWP, and have separate configuration signaling from the Uu BWP. For example, a UE may receive a configuration for the SL BWP from the BS/network. The SL BWP may be (pre)configured for an out-of-coverage NR V2X UE and an RRC_IDLE UE in the carrier. For a UE in RRC_CONNECTED mode, at least one SL BWP may be activated in the carrier.

A resource pool may be a set of time-frequency resources available for SL transmission and/or SL reception. From the viewpoint of a UE, time-domain resources of a resource pool may not be contiguous. A plurality of resource pools may be (pre)configured for the UE in one carrier. From the viewpoint of the PHY layer, the UE may perform unicast, groupcast, and broadcast communication using a configured or preconfigured resource pool.

Hereinafter, sidelink (SL) congestion control will be described.

When the UE autonomously determines an SL transmission resource, the UE may also determine the size and frequency of the resource used by the UE. Needless to say, use of a resource size or frequency above a predetermined level may be restricted due to a constraint from the network or the like. However, when all UEs use a relatively large number of resources in a situation in which many UEs are concentrated in a specific area at a specific time, overall performance may be greatly reduced due to mutual interference.

Thus, the UE needs to monitor a channel state. When determining that excessively many resources are being consumed, the UE may reduce use of a resource thereof. In the present specification, this may be defined as congestion control (CR). For example, the UE may determine whether energy measured in a unit time/frequency resource is equal to or greater than a predetermined level and may adjust the amount and frequency of transmission resources thereof depending on a ratio of unit time/frequency resources in which the energy equal to or greater than the predetermined level has been observed. In the present disclosure, a ratio of time/frequency resources in which energy at a predetermined level or greater is observed may be defined as a channel busy ratio (CBR). The UE may measure for a channel/frequency. In addition, the UE may transmit the measured CBR to a network/eNB.

Figure 17:
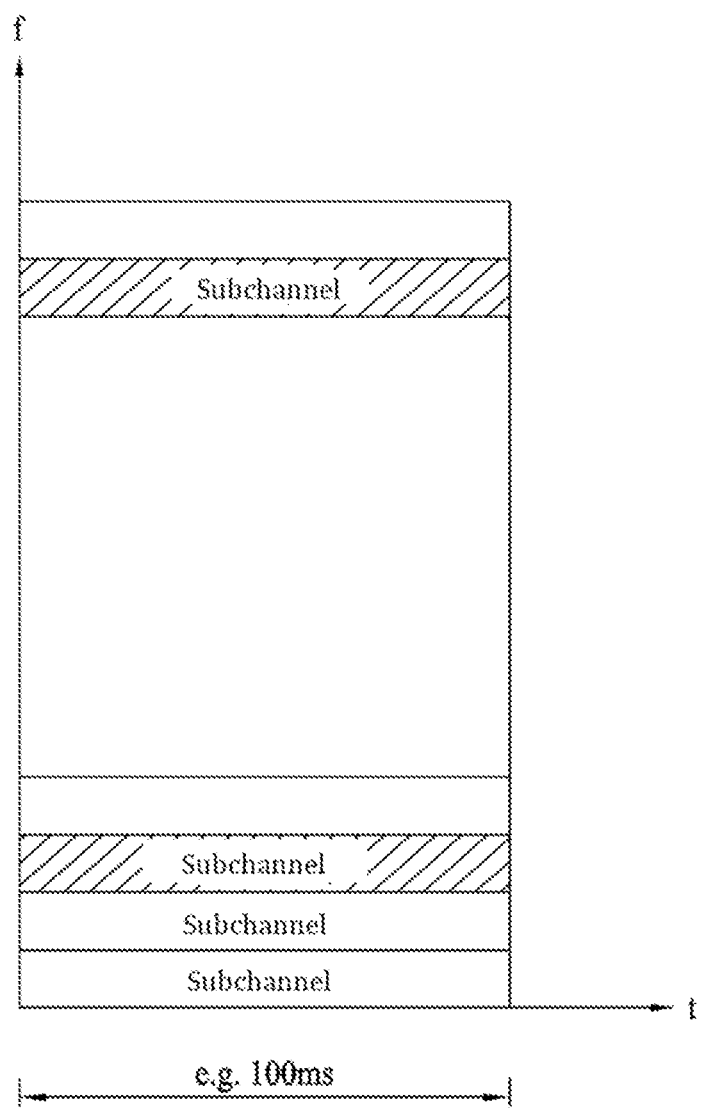
FIG. 17 illustrates a resource unit for measuring a CRB according to an embodiment of the present disclosure.

FIG. 17 illustrates a resource unit for measuring a CRB according to an embodiment of the present disclosure.

Referring to FIG. 17, when the UE measures a Received Signal Strength Indicator (RSSI) on a subchannel basis for a specific time period (e.g., 100 ms), a CBR may represent the number of subchannels having RSSI measurements equal to or greater than a predetermined threshold. Alternatively, the CBR may represent the ratio of subchannels having values equal to or greater than a predetermined threshold to subchannels during a specific time period. For example, in FIG. 17, assuming that hatched subchannels are subchannels having a value greater than or equal to the predetermined threshold, the CBR may represent the ratio of the hatched subchannels during the time period of 100 ms. In addition, the UE may report the CBR to an eNB.

Figure 18:
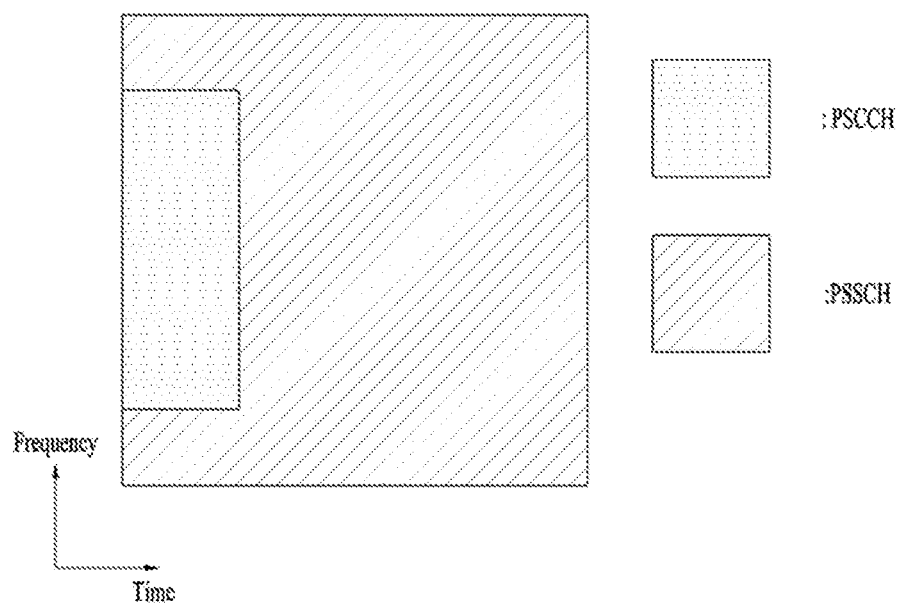
FIG. 18 illustrates an example of the case in which a PSCCH and a PSSCH are multiplexed.

For example, as shown in FIG. 18, when the PSCCH and the PSSCH are multiplexed, the UE may measure one CBR for one resource pool. Here, when a PSFCH resource is configured or preconfigured, the PSFCH resource may be excluded from measurement of the CBR.

Further, congestion control in consideration of a priority of traffic (e.g., a packet) may be required. To this end, for example, the UE may measure a channel occupancy ratio (CR). In detail, the UE may measure a CBR and may measure determine a maximum value CRlimitk for a channel occupancy ratio k CRk in which a channel is occupied by traffic corresponding to each priority (e.g., k) according to the CBR. For example, the UE may derive the maximum value CRlimitk of the channel occupancy for the priority of each traffic based on a predetermined table for a CBR measurement value. For example, in the case of traffic having a relatively high priority, the UE may derive a maximum value for a relatively large channel occupancy. Then, the UE may perform congestion control by limiting the sum of the channel occupancy ratios of traffic having a priority k of traffic lower than i to a predetermined value or less. When this method is used, a stronger channel occupancy limit may be applied to traffic having a relatively low priority.

In addition, the UE may perform SL congestion control using a method such as adjustment of a level of transmission power, packet drop, determination of whether to retransmit, and adjustment of a size of a transmission RB (MCS adjustment).

In NR SL, when a slot format having flexible SCS and FR is used, the length of one OFDM symbol may be changed depending on the SCS and the FR. In particular, in the case of FR2, the length of one OFDM symbol may be reduced and the number of OFDM symbols required for an AGC operation in one slot may be increased. For example, in the case of FR2, when a time required for the AGC operation is 70 us, 1 slot or more needs to be always used for the AGC operation even in SCS of 120 kHz, and overhead may be excessively increased.

According to the present disclosure, in order to reduce the aforementioned overhead, the UE in NR SL may group a plurality of slots according to the FR and/or the SCS and may schedule/sense the grouped slots.

For example, in FR2, the UE may always group two slots in one unit and may schedule/sense the slots in order to increase the number of OFDM symbols present in a transmission unit (e.g., at least one slot or at least one subframe).

Hereinafter, in the present disclosure, transmission of at least two slots in one unit is referred to as slot aggregation A slot aggregation operation may be used in a situation in which a transmission time needs to be long or data with a relatively large payload size is transmitted in order to collect a sufficient amount of energy in the case of a service with a relatively far target coverage as a target, and thus the slots may be scheduled/sensed in units of slot aggregation.

Figure 19:
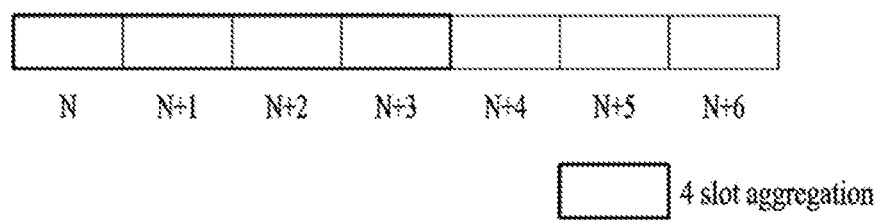
FIG. 19 is a diagram for explaining slot aggregation.

FIG. 19 is a diagram for explaining slot aggregation.

Referring to FIG. 19, slot aggregation may be one scheduling and transmission unit formed by aggregating at least two slots. For example, 4 slots (N to N+3 slots) may be aggregated.

When there is a UE using a slot aggregation method in a resource pool, the following problem may occur in terms of resource allocation. 1) When slot aggregation is (pre)configured in the resource pool, there may be UEs having different slot durations, and in this case, there may be a problem in terms of a resource allocation method for effective data transmission between the UEs having different slot durations. 2) Multi-slots (e.g., N to N+3 slots) need to be ensured to transmit aggregation set data for a slot aggregation operation, and in this case, a resource selection/reselection method may be problematic.

Hereinafter, in the present disclosure, an aggregation set (or an aggregation slot) may refer to at least two aggregated slots.

1. Resource Allocation Method During Slot Aggregation in SL

A resource pool for a UE (hereinafter an N slot UE) with an aggregation set including N slots a normal UE, i.e., a UE (hereinafter a 1 slot UE) that does not use an aggregation set may be preconfigured. That is, a BS may configure a resource pool for each of the UE using the aggregation set (or a UE that performs scheduling/sensing based on the slot aggregation) and the UE that does not use the aggregation set (or a UE that performs scheduling/sensing based on a single slot without a slot aggregation), and thus each of the UEs may (preferentially) use a corresponding configuration resource.

The BS may preconfigure together a resource pool to be used when the aggregation set is used and a resource pool to be used when a single slot is used to the respective UEs. For example, the BS may transmit configuration information on each resource pool to the UE through higher layer signaling/L1 signaling.

For example, the configuration information for each of the resource pools may indicate an allocation position of a resource pool to be used when the aggregation set is used and/or a resource pool to be used when the single slot is used on the time/frequency domain.

In this case, each UE may also use a resource pool of a preconfigured counterpart UE, that is, another UE. For example, the resource pool of the preconfigured counterpart UE may be used based on a CBR or an interference measurement result. In other words, the UE that uses the slot aggregation and the UE that does not use the same may use only a resource configured for each by default, but an operation using a resource pool of another UE based on the CBR or the interference measurement result may also be allowed.

For example, the 1 slot UE may measure a CBR or interference (e.g., ISI or ICI) of a resource pool configured for the N slot UE. When the CBR or the interference measurement result is equal to or less than a preconfigured threshold, the 1 slot UE may also transmit and receive a sidelink signal using the resource pool configured for the N slot UE.

When latency budget of the 1 slot UE (or the N slot UE) is not much left, the 1 slot UE (or the N slot UE) may use the resource pool of the preconfigured counterpart UE to transmit a signal within the latency budget. In other words, the UE that uses the slot aggregation and the UE that does not use the same may use only a resource configured for each by default, but an operation using a resource pool of another UE based on latency budget may also be allowed.

In this case, when the resource pool of the counterpart UE is used, this means that the 1 slot UE uses the resource pool configured for the N slot UE or the N slot UE uses that the resource pool configured for the 1 slot UE.

2. Resource Selection/Reselection Method During Slot Aggregation in SL

Hereinafter, various examples of a resource selection/reselection method for ensuring multi-slots when a UE performs a slot aggregation operation will be disclosed.

During a resource selection/reselection operation, in a step of measuring an RSRP, an RSSI, and an RSRQ of a slot related to after decoding SCI, the UE may refer to only corresponding PSCCH information when a PSCCH is present only in one slot (e.g., the first slot in the time domain among multi-slots included in the aggregation set) in the aggregation set. In other words, when a PSCCH is present only in one slot among multi-slots included in the aggregation set, a sidelink signal may be transmitted and received based on corresponding PSCCH information only.

Alternatively, when a PSCCH is transmitted multiple times in the aggregation set, the UE needs to determine which SCI in a plurality of PSCCHs to refer to in a step of measuring a RSRP, an RSSI, and an RSRQ of a slot related after decoding SCI during a resource selection/reselection operation. In other words, during the resource selection/reselection operation, the SCI and/or slot on which the RSRP, RSSI and RSRQ measurement is based needs to be determined.

A reference for RSRP measurement of a slot is determined during the resource selection/reselection operation in order to determine resources except for resources within a selection window by comparing a RSRP measurement value as a reference with a configured threshold. That is, a selected/reselected resource may be selected/reselected from remaining resources except for a resource with the RSRP equal to or greater than a preconfigured threshold among a plurality of resources included in the selection window.

For example, when a plurality of PSCCHs are present in the aggregation set, that is, when a plurality of PSCCHs are present on the aggregation set, the SCI and/or the slot as a measurement reference may be slots in which the PSCCH is received. In other words, the RSRP used during a resource selection/reselection operation may be measured from the slots in which PSCCHs are received among multi-slots in the aggregation set.

For example, when a plurality of PSCCHs are present in the aggregation set, the UE may use a minimum value, a maximum value, or an average value of RSRP values measured in a slot related to the corresponding PSCCH as a reference. That is, the UE may use the minimum value, the maximum value, or the average value of the RSRP values measured in slots in which a plurality of PSCCHs are received in the aggregation set as a reference value of resource selection/reselection.

In this case, a value to be selected among RSRP values may be configured based on priority, latency, or the like of the aggregation set data. For example, when the priority configured in the aggregation set data is high (e.g., when the priority is higher than configured reference priority) or the latency budget is not much left, the UE may use the maximum value among RSRP values as a reference.

Alternatively, for example, the UE may select an arbitrary value among RSRP values of a slot in which SCI decoding is successful among multi-slots in the aggregation set. In other words, RSRP may be measured only in a slot in which SCI decoding is successful among the multi-slots in the aggregation set, and an arbitrary value among the measured RSRP values may be randomly selected.

Alternatively, when a PSCCH is transmitted multiple times in the aggregation set, the UE may determine an RSSI value as a reference among the plurality of measured RSSI values in the step of measuring the RSSI of a slot related after decoding SCI during a resource selection/reselection operation.

A reference for RSSI measurement of a slot is determined during the resource selection/reselection operation in order to determine a resource corresponding to a predetermined ratio among resources within a selection window based on the RSSI measurement value as a reference.

For example, in RSSI measurement for resource selection/reselection, the UE may use an RSSI (average) value of all slots in the aggregation set as a reference. In other words, an average value of the RSSI values measured in all the slots in the aggregation set may be configured as a reference.

Alternatively, for example, an RSSI (average) value of some slots in the aggregation set may be configured as a reference. In detail, the UE may use an RSSI (average) value of N slots from the first slot (or the last slot) in the time domain among multi-slots included in the aggregation set as a reference. Here, N may be a preconfigured integer. That is, the UE may use an average value of RSSI values measured in the N slots among the multi-slots included in the aggregation set as a reference.

Figure 20:
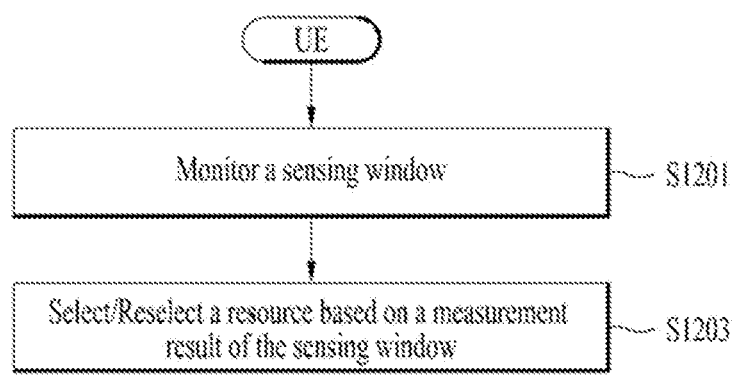
FIG. 20 is a flowchart of a resource selection/reselection method according to an embodiment of the present disclosure.

FIG. 20 is a flowchart of a resource selection/reselection method according to an embodiment of the present disclosure.

Referring to FIG. 20, in S1201, a UE may monitor a sensing window. The sensing window may include resources related to resources included in the selection window. For example, the UE may monitor the resources in the sensing window in units of aggregation slots. Here, the monitoring may include an operation of decoding a PSCCH received on the resources in the sensing window or measuring an RSRP, an RSSI, an RSRQ, and the like for the resources in the sensing window.

In S1203, the UE may perform resource selection/reselection based on the measurement result of the sensing window. For example, when the RSRP value measured from the sensing window is greater than a preconfigured RSRP threshold, the UE may exclude a candidate resource in the selection window related to the resource in which the RSRP value is measured. Alternatively, when the RSSI value measured from the sensing window is within a preconfigured RSSI threshold, the UE may select/reselect a candidate resource in the selection window related to the resource in which the RSSI value is measured.

Figure 21:
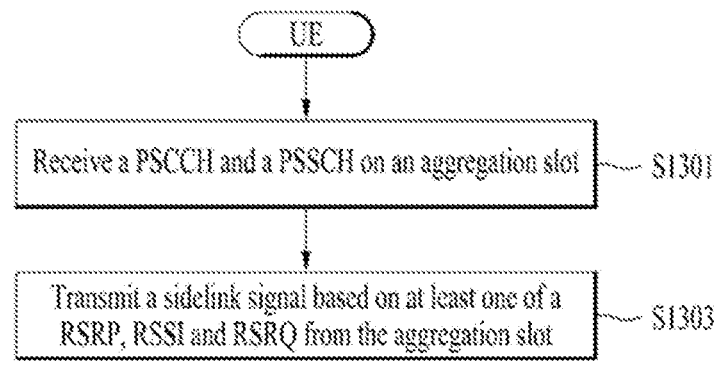
FIG. 21 is a flowchart of a method of transmitting a sidelink signal according to an embodiment of the present disclosure.

FIG. 21 is a flowchart of a method of transmitting a sidelink signal according to an embodiment of the present disclosure.

Referring to FIG. 21, in S1301, a UE may receive a physical sidelink control channel (PSCCH) and a physical sidelink shared channel (PSSCH) on an aggregation slot. Here, the aggregation slot may include multi-slots.

In S1303, the UE may transmit a sidelink signal on a resource selected based on at least one of Reference signal received power (RSRP), received signal strength indication (RSSI), or reference signal received quality (RSRQ) measured from the aggregation slot.

The selected resource may be selected from remaining resources except for a resource with RSRP equal to or greater than a preconfigured threshold among a plurality of resources included in a selection window.

In this case, based on reception of the plurality of PSCCHs on the aggregation slot, the RSRP may be measured from each of the slots in which a plurality of PSCCHs is received among the multi-slots. That is, an RSRP as a reference during a resource selection/reselection operation of the UE may be measured from each of the slots in which the plurality of PSCCHs is received.

For example, the selected resource may be selected based on a minimum value, a maximum value, or an average value of RSRP values measured in each of the slots in which the plurality of PSCCHs is received.

For example, based on that priority configured for data received on the aggregation slot is equal to or greater than preconfigured reference priority, the selected resource may be selected based on the maximum value of the RSRP values measured from the respective slots in which the plurality of PSCCHs is received.

For example, the RSRP may be measured from at least one slot for receiving at least one PSCCH, decoding of which is successful, among the plurality of PSCCHs.

Alternatively, the selected resource may be selected based on RSSI values measured from each of N slots from a slot located first in the time domain among slots in which the plurality of PSCCHs are received, N being a natural number.

The aforementioned various examples of the present disclosure may overcome a problem in terms of a resource allocation operating method for effective data transmission and a problem in terms of a resource selection/reselection operating method for ensuring multi-slots, which may occur when the UE/BS applies slot aggregation to NR SL.

It is obvious that each of the examples of the proposed methods may also be included as one of various embodiments of the present disclosure, and thus each example may be regarded as a kind of proposed method. Although the proposed methods may be implemented independently, some of the proposed methods may be combined (or merged) and implemented. The methods proposed in the present disclosure have been described in the context of the 3GPP NR system for convenience of description, the scope of systems to which the proposed methods are applied may be extended to other systems in addition to the 3GPP NR system. For example, the proposed methods of the present disclosure may be extended and applied to D2D communication. Here, D2D communication refers to direct communication between UEs over a radio channel. Although the UE means a user terminal, a network equipment such as a BS may also be regarded as a kind of UE if the network equipment transmits and receives a signal according to UE-to-UE communication schemes. In addition, the proposed methods of the present disclosure may be limitedly applied to MODE 3 V2X operations (and/or MODE 4 V2X operations). For example, the proposed methods of the present disclosure may be limitedly applied to transmission of a preconfigured (and/or signaled) (specific) V2X channel (and/or signal) (e.g., PSSCH (and/or related) PSCCH and/or PSBCH)). For example, the proposed methods of the present disclosure may be limitedly applied when a PSSCH and a PSCCH (related thereto) are transmitted such that they are located to be adjacent (and/or non-adjacent) (in the frequency domain) (and/or when transmission is performed based on the value (and/or range) of a preconfigured (and/or signaled) MCS (coding rate and/or RB). For example, the proposed methods of the present disclosure may be limitedly applied to MODE 3 (and/or MODE 4) V2X carriers (MODE 4 (and/or 3) SL (and/or UL) SPS carriers and/or MODE 4 (and/or 3) dynamic scheduling carriers). Moreover, the proposed methods of the present disclosure may be (limitedly) applied when the positions and/or number of synchronization signal (transmission (and/or reception)) resources (and/or the positions and/or number of subframes in a V2X resource pool (and/or the size and number of subchannels)) are the same (and/or (partially) different) between carriers. For example, the proposed methods of the present disclosure may be extended and applied to (V2X) communication between a BS and a UE. For example, the proposed methods of the present disclosure may be limitedly applied to unicast (SL) communication (and/or multicast (or groupcast) (SL) communication and/or broadcast (SL) communication).

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
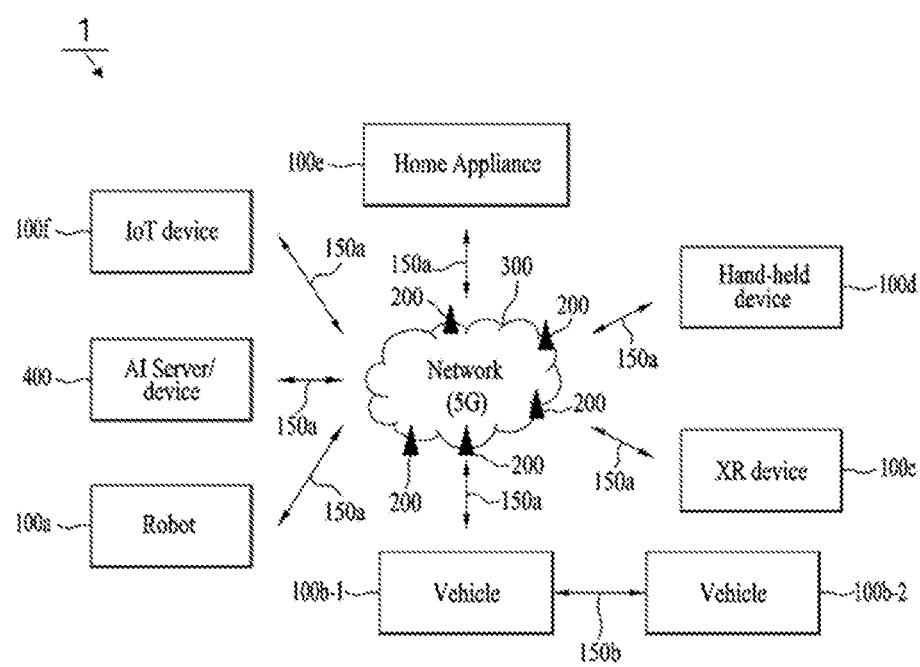
FIGS. 22 to 28 are block diagrams illustrating various devices applicable to embodiment(s) of the present disclosure.

FIG. 22 illustrates a communication system 1 applied to the present disclosure.

Referring to FIG. 22, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to which the Present Disclosure is Applied

Figure 23:
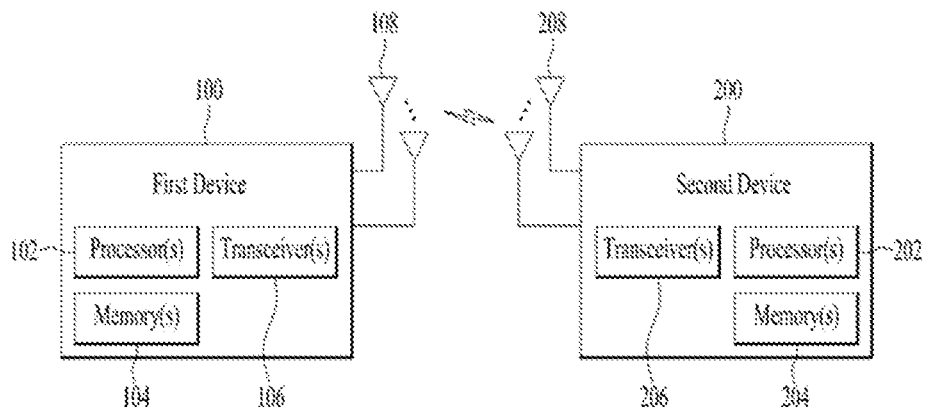

FIG. 23 illustrates wireless devices applicable to the present disclosure.

Referring to FIG. 23, a first wireless device 100 and a second wireless device 200 may transmit radio signals through a variety of RATs (e.g., LTE and NR). Herein, {the first wireless device 100, the second wireless device 200} correspond to {wireless device 100x, base station 200} and/or {wireless device 100x, wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Here, a wireless communication technology implemented in the wireless devices 100 and 200 of the present disclosure may include Narrowband Internet of Things for low power communication as well as LTE, NR, and 6G. In this case, for example, the NB-IoT technology may be an example of a Low Power Wide Area Network (LPWAN) technology and may be implemented in standards such as LTE category (Cat) NB1 and/or LTE Cat NB2, and is not limited to the above-described name. Additionally or alternatively, the wireless communication technology implemented in the wireless devices 100 and 200 according to the present disclosure may perform communication based on the LTE-M technology. In this case, for example, LTE-M technology may be an example of the LPWAN technology and may be called various terms such as enhanced Machine Type Communication (eMTC). For example, the LTE-M technology may be implemented as at least one of various standards such as 1) LTE Category (LTE CAT) 0, 2) LTE Cat M1, 3) LTE Cat M2, 4) LTE non-Bandwidth Limited (non-BL), 5) LTE-MTC, 6) LTE Machine Type Communication, and/or 7) LTE M and may not be limited to the aforementioned terms. Additionally or alternatively, the wireless communication technology implemented in the wireless devices 100 and 200 according to the present disclosure may include at least one of ZigBee, Bluetooth, or Low Power Wide Area Network (LPWAN) in consideration of low power communication and is not limited to the aforementioned terms. For example, the ZigBee technology may generate personal area networks (PAN) related to small/low-power digital communication based on various standards such as IEEE 802.15.4 and may be called various terms.

Figure 24:
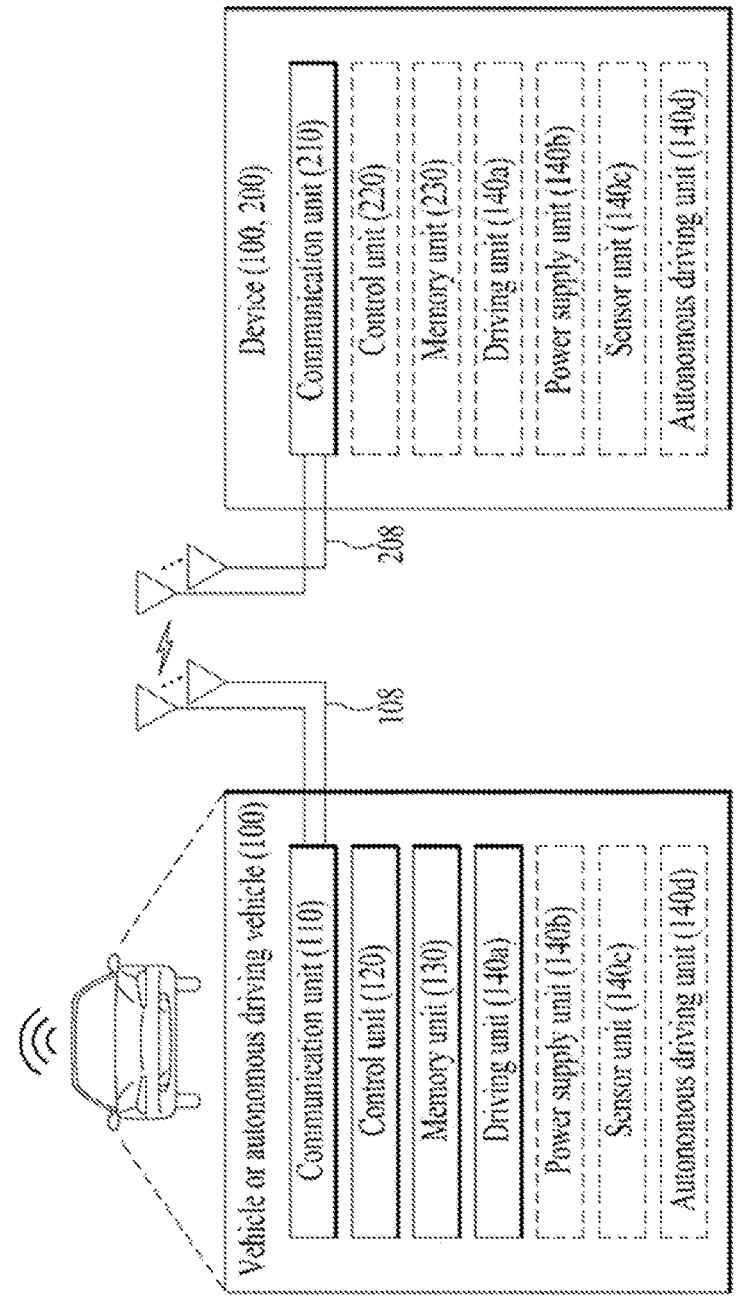

Example of a Vehicle or an Autonomous Driving Vehicle to which the Present Disclosure is Applied FIG. 24 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 21, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of AR/VR and Vehicle to which the Present Disclosure is Applied

Figure 25:
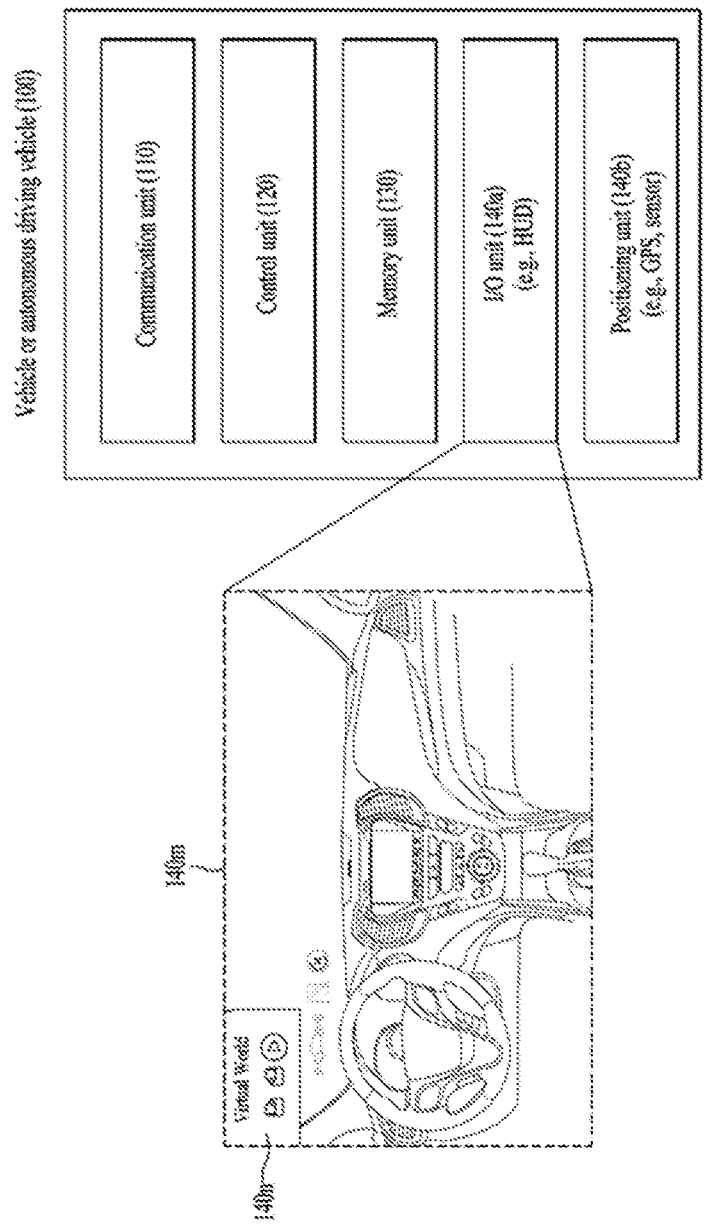

FIG. 25 illustrates a vehicle applied to the present disclosure. The vehicle may be implemented as a transport means, an aerial vehicle, a ship, etc.

Referring to FIG. 25, a vehicle 100 may include a communication unit 110, a control unit 120, a memory unit 130, an I/O unit 140*a*, and a positioning unit 140*b*.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of XR Device to which the Present Disclosure is Applied

Figure 26:
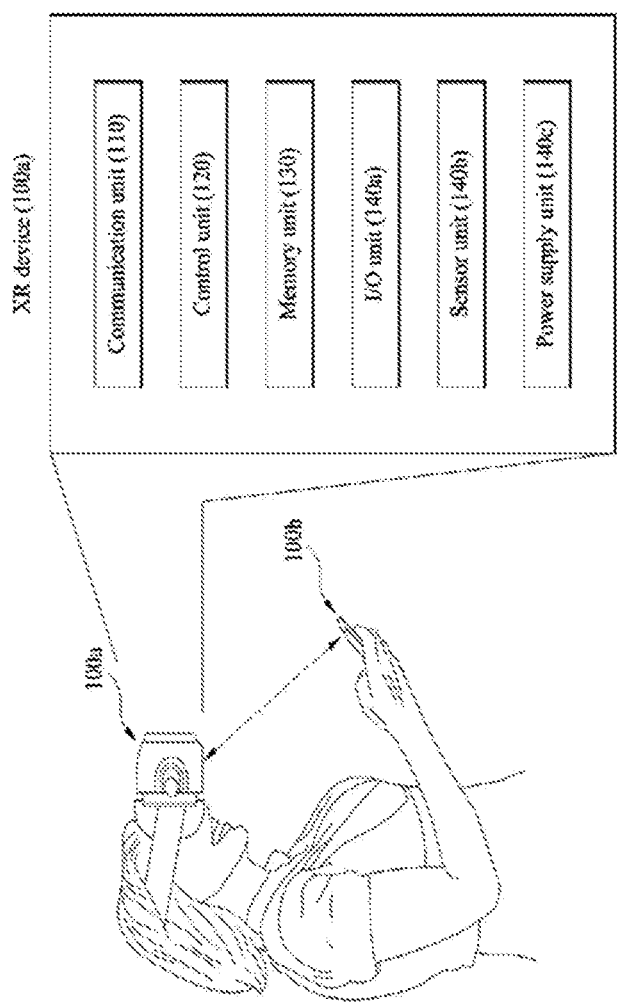

FIG. 26 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 26, an XR device 100a may include a communication unit 110, a control unit 120, a memory unit 130, an I/O unit 140a, a sensor unit 140b, and a power supply unit 140c.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of Robot to which the Present Disclosure is Applied

Figure 27:
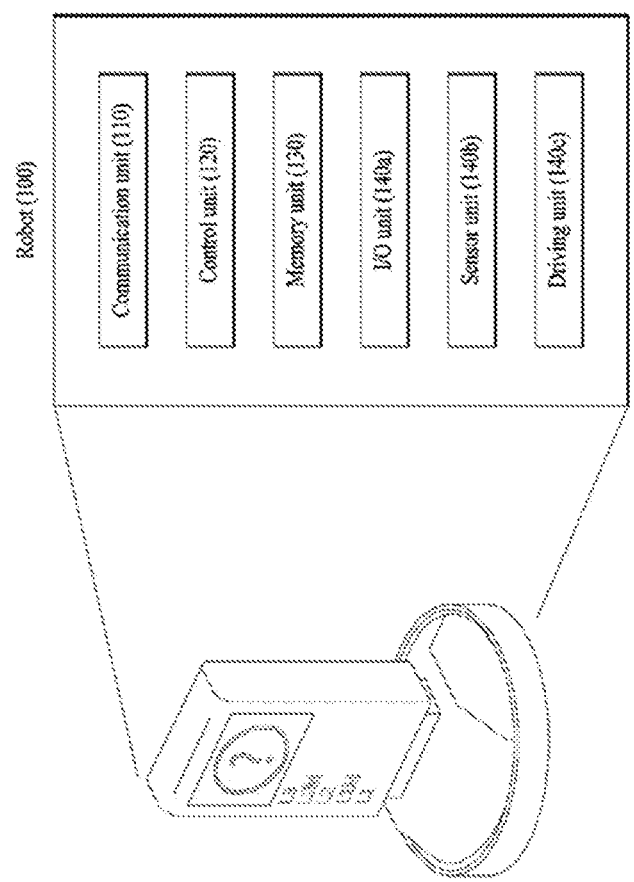

FIG. 27 illustrates a robot applied to the present disclosure. The robot may be categorized into an industrial robot, a medical robot, a household robot, a military robot, etc., according to a used purpose or field.

Referring to FIG. 27, a robot 100 may include a communication unit 110, a control unit 120, a memory unit 130, an I/O unit 140a, a sensor unit 140b, and a driving unit 140c.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Examples of AI Device to which the Present Disclosure is Applied

Figure 28:
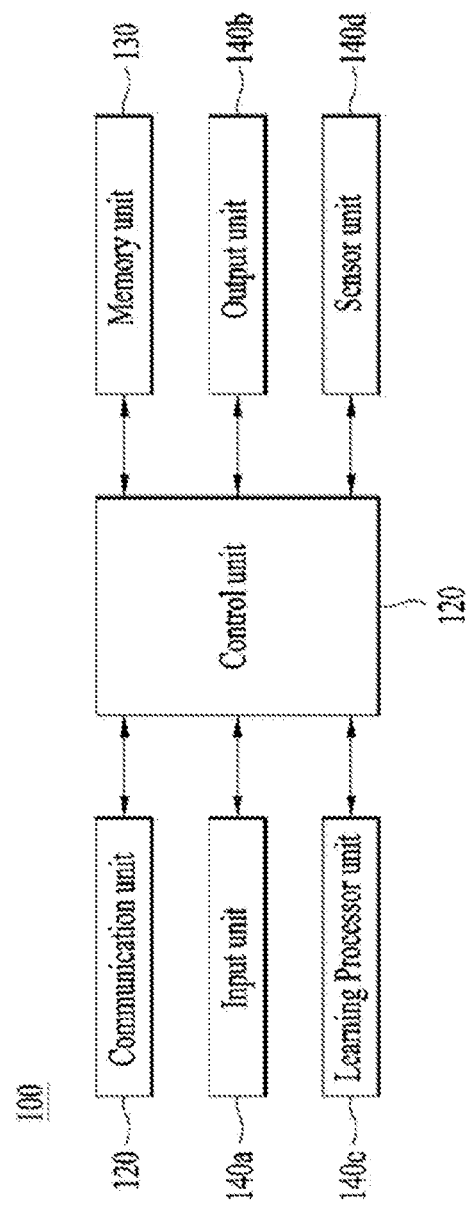

FIG. 28 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 28, an AI device 100 may include a communication unit 110, a control unit 120, a memory unit 130, an I/O unit 140a/140b, a learning processor unit 140c, and a sensor unit 140d.

The communication unit 110 may transmit and receive wired/radio signals (e.g., sensor information, user input, learning models, or control signals) to and from external devices such as other AI devices (e.g., 100x, 200, or 400 of FIG. 22) or an AI server (e.g., 400 of FIG. 22) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 22). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 19). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL AVAILABILITY

The above-described embodiments of the present disclosure are applicable to various mobile communication systems.

The invention claimed is:

1. A method of a first user equipment (UE) in a wireless communication system, the method comprising:
   configuring a resource pool for communication with a second UE;
   receiving control information from the second UE; and
   receiving data based on the control information from the second UE, wherein:
   the control information includes information for a first resource set and a second resource set in the resource pool, and the first resource set includes an aggregation slot configured with consecutive slots and the second resource set includes a non-aggregation slot configured with one slot;
   the control information being received in each of the consecutive slots;
   based on a priority of the data being above a threshold, a resource for the data is selected from the first resource set based on a maximum value of reference signal received powers (RSRPs) measured from the each of the consecutive slots; and
   based on there being no resource within a remaining latency budget in the first resource set, a resource for the data within the remaining latency budget is selected from the second resource set.

2. An apparatus for a first user equipment (UE) in a wireless communication system, the apparatus comprising:
   a transceiver;
   at least one processor connected to the transceiver; and
   at least one memory operatively connected to the at least one processor and configured to store at least one instruction for allowing the at least one processor to perform operations, wherein:
   the processor configures a resource pool for communication with a second UE, receives control information from the second UE, and receives data based on the control information from the second UE;
   the control information includes information for a first resource set and a second resource set in the resource pool, and the first resource set includes an aggregation slot configured with consecutive slots and the second resource set includes a non-aggregation slot configured with one slot;
   the control information being received in each of the consecutive slots;
   based on a priority of the data being above a threshold, a resource for the data is selected from the first resource set based on a maximum value of reference signal received powers (RSRPs) measured from the each of the consecutive slots; and
   based on there being no resource within a remaining latency budget in the first resource set, a resource for the data within the remaining latency budget is selected from the second resource set.

3. A processor for performing operations for a first user equipment (UE) in a wireless communication system, the operations comprising:
   configuring a resource pool for communication with a second UE;
   receiving control information from the second UE; and
   receiving data based on the control information from the second UE, wherein:
   the control information includes information for a first resource set and a second resource set in the resource pool, and the first resource set includes an aggregation slot configured with consecutive slots and the second resource set includes a non-aggregation slot configured with one slot; and
   the control information being received in each of the consecutive slots;
   based on a priority of the data being above a threshold, a resource for the data is selected from the first resource set based on a maximum value of reference signal received powers (RSRPs) measured from the each of the consecutive slots; and
   based on there being no resource within a remaining latency budget in the first resource set, a resource for the data within the remaining latency budget is selected from the second resource set.

* * * * *